United States Patent
Marchaj

(10) Patent No.: US 11,365,647 B2
(45) Date of Patent: Jun. 21, 2022

(54) CLOSED LOOP FAN INLET VANE ANTI ICING SYSTEM

(71) Applicant: United Technologies Corporation, Farmington, CT (US)

(72) Inventor: Ian T. Marchaj, Old Saybrook, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 54 days.

(21) Appl. No.: 16/804,905

(22) Filed: Feb. 28, 2020

(65) Prior Publication Data
US 2021/0270148 A1 Sep. 2, 2021

(51) Int. Cl.
*F01D 25/02* (2006.01)
*F02C 7/047* (2006.01)

(52) U.S. Cl.
CPC .............. *F01D 25/02* (2013.01); *F02C 7/047* (2013.01); *F05D 2220/32* (2013.01); *F05D 2260/20* (2013.01)

(58) Field of Classification Search
CPC ................................. F01D 25/02; F02C 7/047
See application file for complete search history.

(56) References Cited

U.S. PATENT DOCUMENTS

| 10,113,444 B2* | 10/2018 | Huang ................... F01D 9/065 |
| 2005/0039435 A1 | 2/2005 | Ackerman et al. |
| 2015/0345327 A1 | 12/2015 | Huang et al. |
| 2016/0160758 A1 | 6/2016 | Marchaj |
| 2016/0298540 A1 | 10/2016 | Suciu et al. |
| 2018/0229850 A1 | 8/2018 | Manheere et al. |

OTHER PUBLICATIONS

European Search Report for European Application No. 21158739.9 dated Jul. 13, 2021.

* cited by examiner

*Primary Examiner* — Ninh H. Nguyen
*Assistant Examiner* — John S Hunter, Jr.
(74) *Attorney, Agent, or Firm* — Carlson, Gaskey & Olds, P.C.

(57) ABSTRACT

A gas turbine engine de-icing system includes a heat exchanger. A coolant loop is in fluid communication with the heat exchanger and is configured to circulate a heat transfer fluid. An engine oil loop is in fluid communication with the heat exchanger and is configured to transfer heat to the heat transfer fluid. A gas turbine engine inlet structure has at least one fan inlet guide vane. A spray bar is disposed at least partially in at least one fan inlet guide vane. The spray bar is in fluid communication with the coolant loop. The spray bar is configured to spray the heat transfer fluid onto an inner surface of the at least one fan inlet guide vane to de-ice the fan inlet guide vane.

19 Claims, 7 Drawing Sheets

CLOSED LOOP FAN INLET VANE ANTI ICING SYSTEM

BACKGROUND

This disclosure relates to a gas turbine engine de-icing system used, for example, for a fan inlet structure.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Gas turbine engine inlet components, such as the fan nacelle, are subject to icing during some engine operating conditions. Ice accumulation at the engine inlet can adversely impact engine operation. To this end, de-icing systems are used to melt any ice on the engine's inlet surfaces.

SUMMARY

In one exemplary embodiment, a gas turbine engine de-icing system includes a heat exchanger. A coolant loop is in fluid communication with the heat exchanger and is configured to circulate a heat transfer fluid. An engine oil loop is in fluid communication with the heat exchanger and is configured to transfer heat to the heat transfer fluid. A gas turbine engine inlet structure has at least one fan inlet guide vane. A spray bar is disposed at least partially in at least one fan inlet guide vane. The spray bar is in fluid communication with the coolant loop. The spray bar is configured to spray the heat transfer fluid onto an inner surface of the at least one fan inlet guide vane to de-ice the fan inlet guide vane.

In a further embodiment of any of the above, the heat exchanger is arranged in a passageway configured to be exposed to an airflow.

In a further embodiment of any of the above, a fan nacelle and a core nacelle that provide a bypass flow path. The passageway is in fluid communication with the bypass flow path.

In a further embodiment of any of the above, an annular manifold is arranged in the gas turbine engine inlet structure. The annular manifold is in fluid communication with the spray bar.

In a further embodiment of any of the above, the engine inlet structure is a fan nacelle. The heat transfer fluid travels radially inward through the spray bar from the fan nacelle toward a nose cone.

In a further embodiment of any of the above, the heat transfer fluid collects in the nose cone and runs towards a bottom of the fan nacelle, where it is collected and returned to the coolant loop.

In a further embodiment of any of the above, a plurality of spray bars and a plurality of fan inlet guide vanes arranged circumferentially about the nose cone. One of the plurality of spray bars extend into each of the plurality of fan inlet guide vanes.

In a further embodiment of any of the above, the spray bar is configured to spray the heat transfer fluid towards a leading edge of the fan inlet guide vane and a second spray bar is arranged in the fan inlet guide vane. The second spray bar is configured to spray the heat transfer fluid towards a trailing edge of the fan inlet guide vane.

In a further embodiment of any of the above, the coolant loop includes a reservoir and a pump configured to circulate the heat transfer fluid. The reservoir is arranged downstream from the manifold and is configured to collect the heat transfer fluid.

In a further embodiment of any of the above, at least one of a gearbox and bearing system is in fluid communication with the engine oil loop.

In a further embodiment of any of the above, the gearbox is configured to operatively connect a turbine section and a fan section.

In a further embodiment of any of the above, the heat transfer fluid is a phase change fluid.

In a further embodiment of any of the above, the heat transfer fluid changes phase from a liquid to a gas or saturated vapor in a range of 200° F.-500° F. (93° C.-260° C.).

In another exemplary embodiment, a method of de-icing a gas turbine engine component includes the steps of circulating an engine fluid to a heat exchanger, rejecting heat from the engine fluid to a heat transfer fluid, circulating the heat transfer fluid to a fan inlet guide vane and de-icing the fan inlet guide vane with the heat transfer fluid.

In a further embodiment of any of the above, the fluid is engine oil. The circulating the engine fluid step includes pumping the engine oil from at least one of a gearbox and bearing system.

In a further embodiment of any of the above, the circulating the heat transfer fluid step comprises directing the heat transfer fluid onto an inner surface of the fan inlet guide vane.

In a further embodiment of any of the above, the heat transfer fluid is a phase change fluid and includes the step of spraying gaseous or saturated vapor heat transfer fluid onto the fan inlet guide vane to de-ice the fan inlet guide vane. The gaseous or saturated vapor heat transfer fluid is condensed to a liquid heat transfer fluid with the de-iced fan inlet guide vane.

In a further embodiment of any of the above, the method includes the step of collecting the condensed liquid heat transfer fluid in a reservoir.

In another exemplary embodiment, a gas turbine engine includes an inlet structure that has at least one fan inlet guide vane and means for directing a heat transfer fluid onto an inner surface of the at least one fan inlet guide vane.

In a further embodiment of any of the above, the heat transfer fluid is communicated to the at least one fan inlet guide vane from a coolant loop in fluid communication with a heat exchanger.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
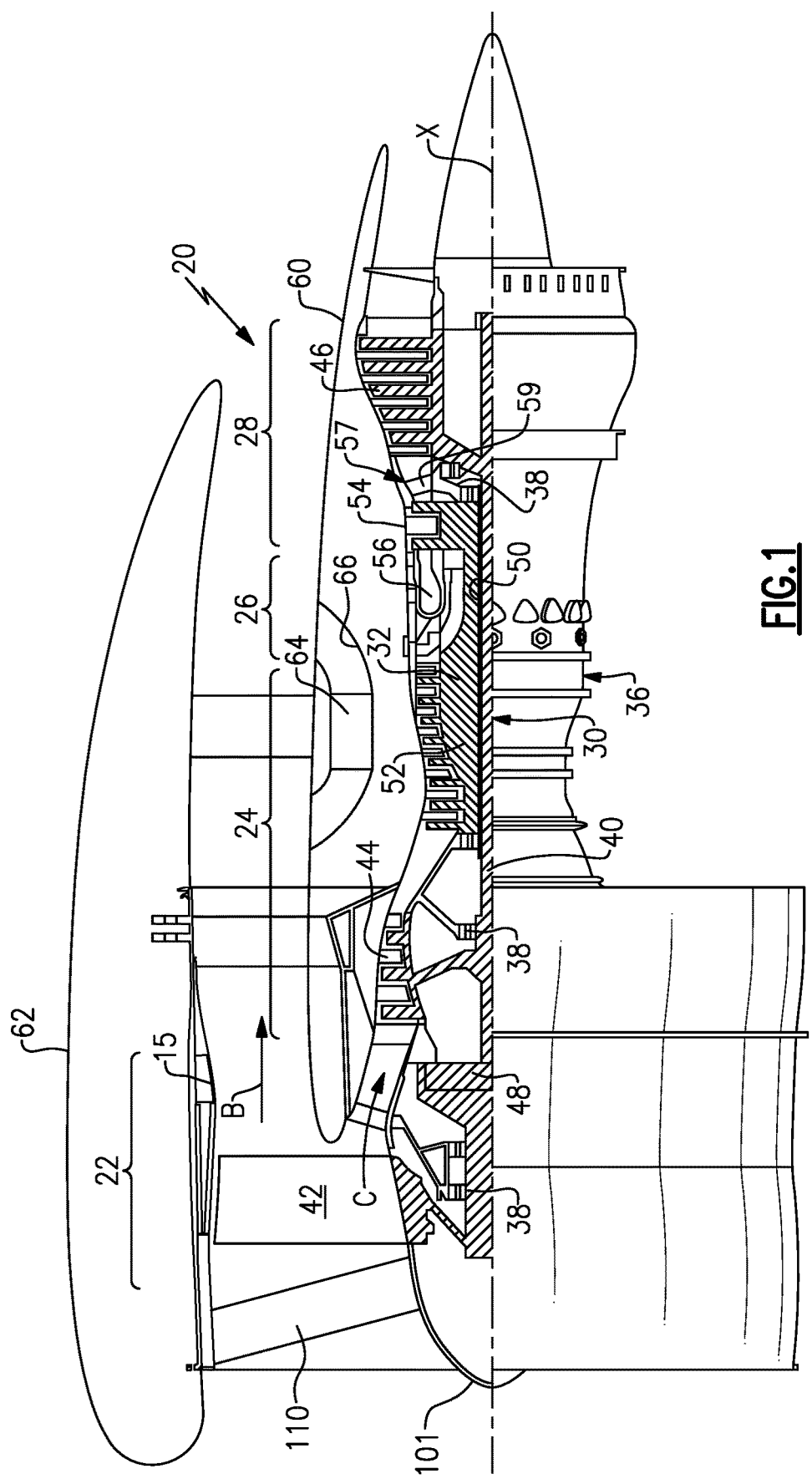
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool and single-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The engine 20 includes a core nacelle 60 and a fan nacelle 62. A fan nacelle 62 provides an inlet to the engine 20. A plurality of fan inlet guide vanes 110 may be arranged forward of the fan 42. A passageway 66 is arranged in the core nacelle 60 to provide an air flow from the bypass flow path through the passageway 66. A heat exchanger 64 is arranged in the passageway 66.

Figure 2:
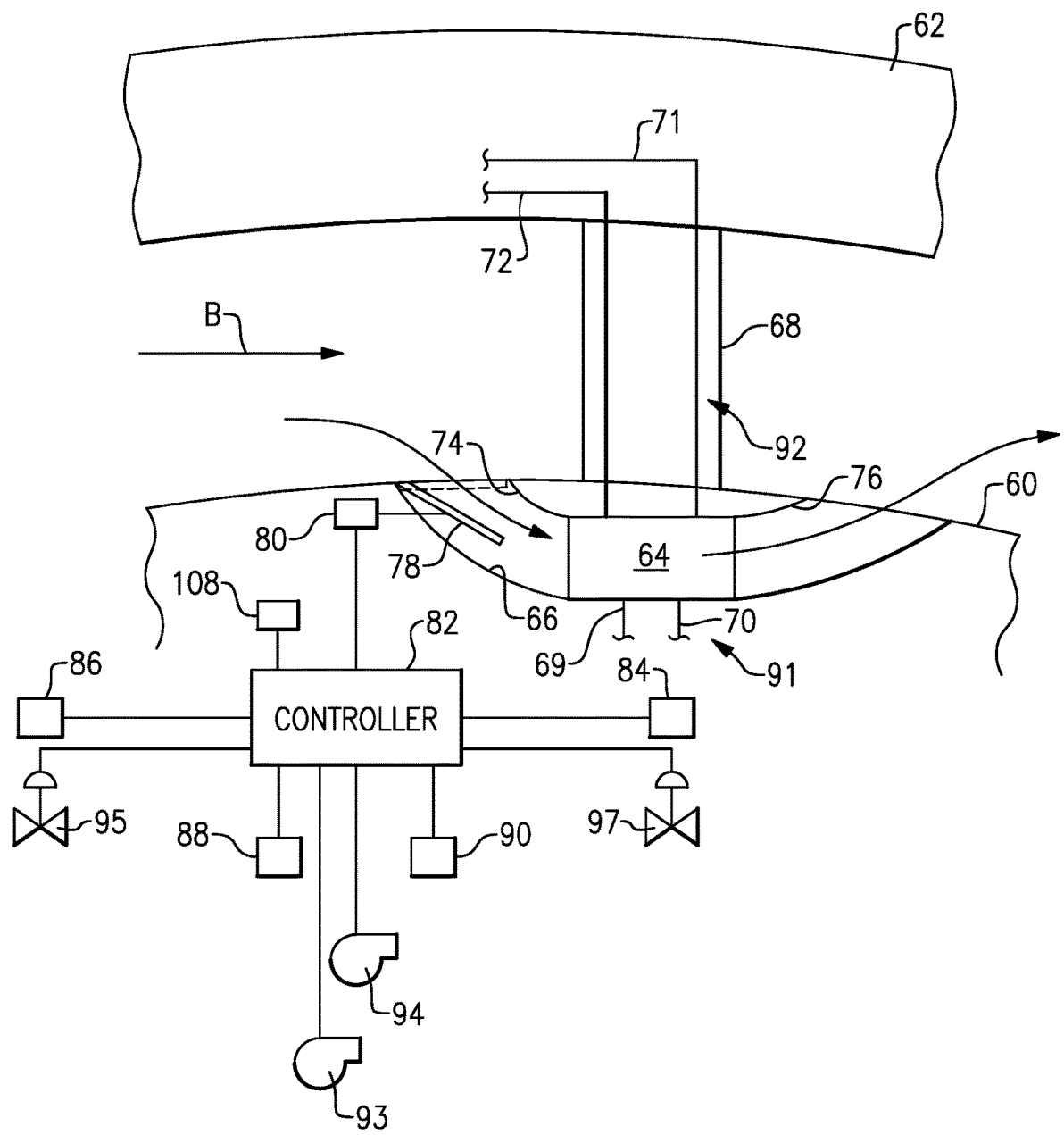
FIG. 2 is a schematic view of a portion of the example de-icing system.

As shown in FIG. 2, the heat exchanger 64 is in fluid communication with an engine oil loop 91 that includes oil lines 69, 70. A heat transfer loop or coolant loop 92 is also in fluid communication with the heat exchanger and includes coolant lines 71, 72. The coolant lines 72 extend from the heat exchanger 64 through a bifurcation 68 arranged in the bypass flow path and interconnecting the core nacelle 60 to the fan nacelle 62.

The passageway 66 provides an inlet 74 and an exit 76. Air flow through the passageway 66 may be selectively regulated by a door 78 that opens and closes in response to an actuator 80. A controller 82 communicates with the actuator 80 to command a position of the door 78 in response to inputs, such as a manual input 84 from a pilot or an automatic input 86 based upon an icing algorithm, for example. The controller 82 communicates with various sensors 88, 90, such as temperature and pressure sensors, which can be used to predict an icing condition and desired heat transfer characteristics of the heat exchanger based upon engine operation.

Figure 3:
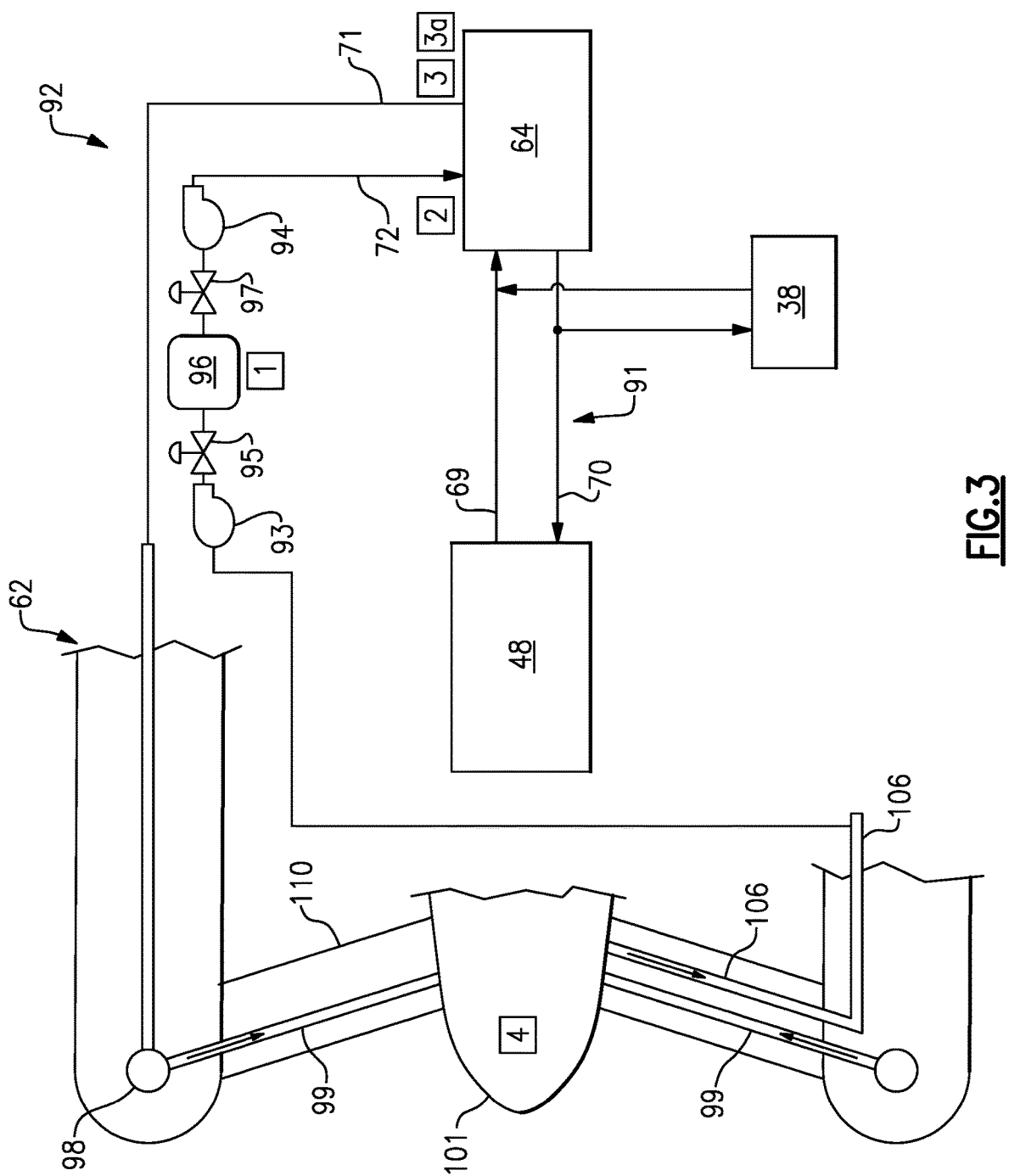
FIG. 3 schematically illustrates another portion of the example de-icing system.

Referring to FIG. 3, the engine oil loop 91 circulates lubrication oil from the geared architecture 48 and/or the bearings 38 to the heat exchanger 64 for cooling. The coolant loop 92 circulates a heat transfer fluid to a manifold 98 within the fan nacelle 62. The heat transfer fluid may be a coolant, for example. In this example, the manifold 98 is an annular manifold, arranged in a cavity of the fan nacelle 62. The annular manifold 98 is arranged at an axial position near the fan inlet guide vanes 110. The manifold 98 communicates a coolant to radially extending spray bars 99 arranged within fan inlet guide vanes 110.

The coolant is a phase change fluid, for example, that changes phase from a liquid to a gas or saturated vapor in an operating range of the engine oil, such as a range of 200° F.-500° F. (93° C.-260° C.). One example phase change fluid is ammonia 2, 3, 3, 3-tetrafluoropropene, 2, 2-dichloro-1, 1, 1-trifluoroethane, although it should be understood that other phase change fluids may also be used.

A fluid reservoir 96 and first and second pumps 93, 94 are arranged in the coolant loop 92. First and second valves 95, 97 are provided respectively between the first and second pumps 93, 94 and the reservoir 96.

The fluid is communicated to the annular manifold 98, and then the radially extending spray bars 99 as a vapor. The vapor is sprayed onto a surface of the fan inlet guide vane 110. The vapor works to de-ice the fan nacelle 62 and fan inlet guide vanes 110. As the fluid cools, it condenses, becoming a liquid. The liquid then runs to the bottom of the fan nacelle 62, and is communicated back to the reservoir 96.

Figure 4:
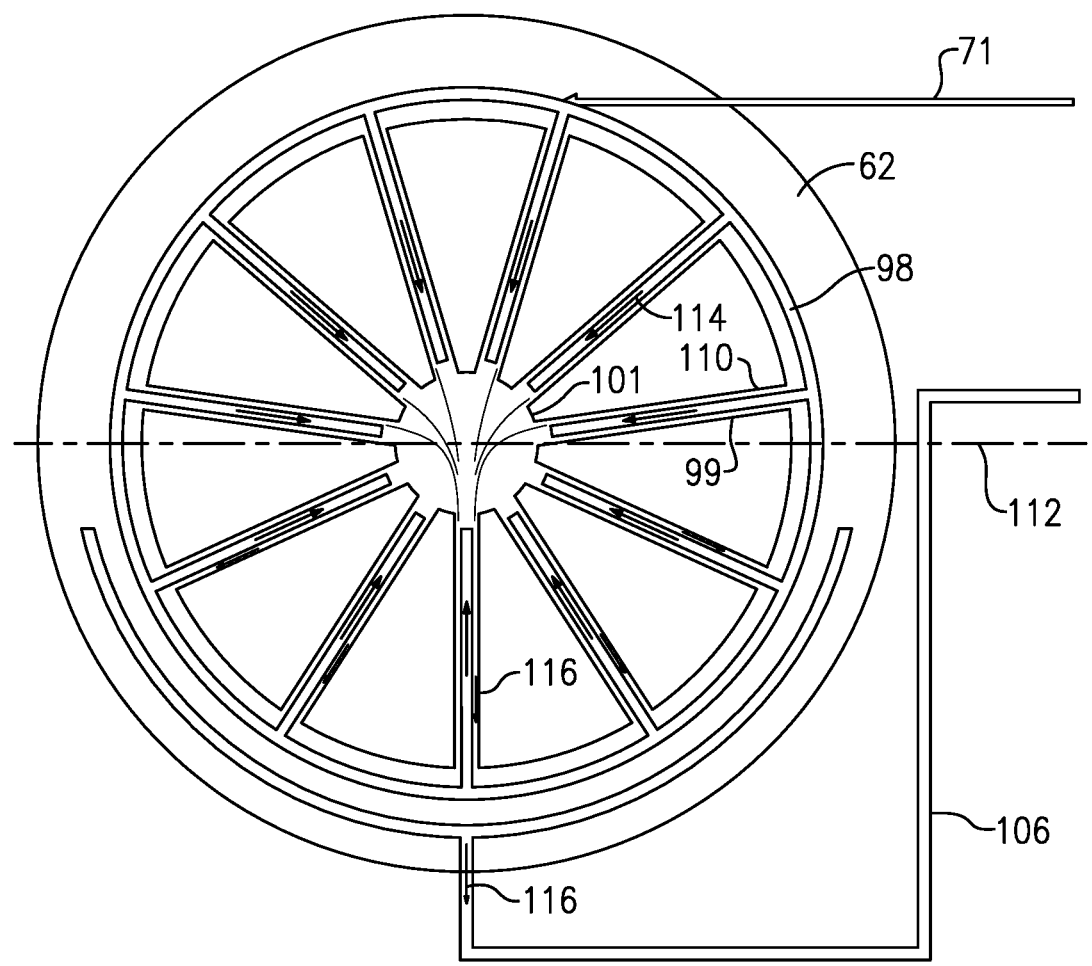
FIG. 4 schematically illustrates a front view of the example de-icing system.

FIG. 4 schematically illustrates a front view of the fan nacelle 62. A plurality of fan inlet guide vanes 110 are arranged circumferentially about the nose cone 101. A spray bar 99 is arranged within each of the fan inlet guide vanes 110. Each of the spray bars 99 is in fluid communication with the annular manifold 98. The vapor 114 travels radially inward through the spray bars 99 from the annular manifold 98 toward the nose cone 101. As the fluid 114 travels through the spray bars 99, vapor 114 is sprayed outward from the spray bars 99 to an inner surface of the vane 110 for de-icing the vane 110. The vapor 114 is also used to de-ice the nose cone 101. As the vapor 114 fills the volume of the nose cone 101, heat transfer between an inner surface of the nose cone 101 and the vapor 114 may de-ice the nose cone 101.

The fan nacelle 62 has an upper half and a lower half divided by a plane 112. A return manifold 106 is arranged in the lower half of the fan nacelle 62 below the plane 112. In the lower half, as vapor 114 is sprayed out of the spray bars 99, it cools and turns to a liquid 116, which runs back down the vane 110 to the return manifold 106. In the upper half, as vapor 114 is sprayed out of the spray bar 99, it cools and turns to a liquid 116, and runs inward to the nose cone 101, then through a vane 110 in the lower half to the return manifold 106. The liquid 116 is then communicated via the return manifold 106 to the reservoir 96 via the pump 93 (shown in FIG. 3). The return manifold 106 may be semi-circular in shape, for example, and extend about the fan nacelle 62 below the plane 112. Although a particular number of fan inlet guide vanes 110 are illustrated, more or fewer may be utilized.

Figure 5:
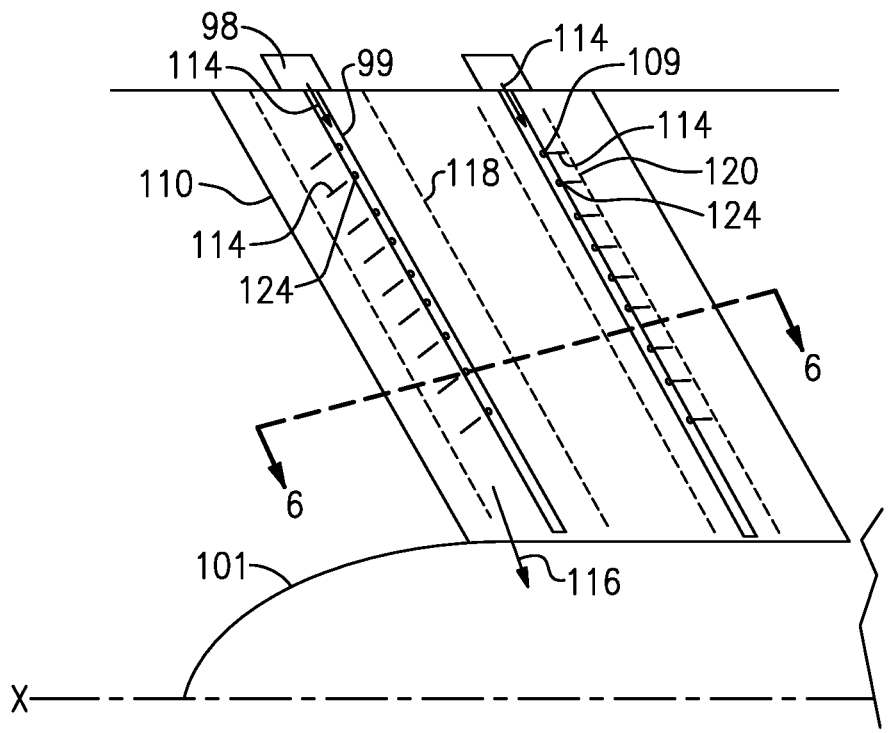
FIG. 5 illustrates an example fan inlet guide vane of the example de-icing system.

FIG. 5 schematically shows an example fan inlet guide vane 110. The fan inlet guide vane 110 is an airfoil extending between the fan nacelle 62 and the nose cone 101. In this example, two spray bars 99, 109 extend through the vane 110. The vane 110 has two cavities 118, 120 through which the spray bars 99, 109 extend. Vapor 114 is sprayed onto an inner surface of the vane 110 through a plurality of holes 124 in the spray bars 99, 109. The holes 124 may extend along an entire length of the spray bars 99, 109, for example. The vapor 114 heats the fan inlet guide vanes 110 to de-ice, then condenses into a liquid 116, and runs towards the nose cone 101.

Figure 6:
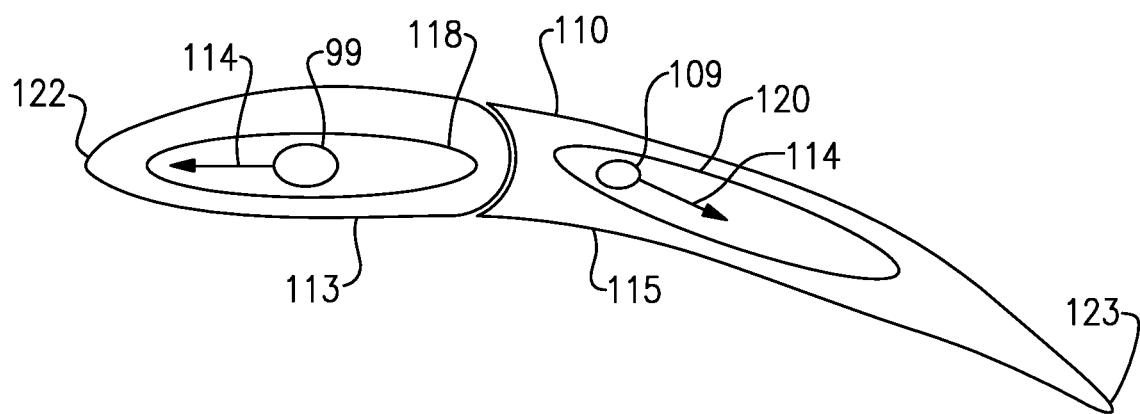
FIG. 6 schematically illustrates a cross-sectional view of the example fan inlet guide vane of FIG. 5.

FIG. 6 shows a cross-sectional view of the example fan inlet guide vane 110. The forward spray bar 99 sprays fluid 114 forward towards a leading edge 122. The fluid 114 impinges upon an inner surface of the forward cavity 118. The rear spray bar 109 sprays fluid 114 aftward towards a trailing edge 123. The fluid 114 impinges upon inner surfaces of the cavities 118, 120 to heat and de-ice the vane 110. This arrangement may be particularly useful for an actuated airfoil. The airfoil 110 has a front portion 113 that remains stationary, and an aft portion 115 that rotates relative to the front portion 113. The forward cavity 118 is arranged within the front portion 113, while the aft cavity 120 is arranged within the aft portion 115. As the aft portion 115 is rotated, the trailing end 123 needs to be de-iced. The example spray bar 109 sprays the fluid 114 aftward towards the trailing edge 123 to heat the back portion of the airfoil 110. Although two spray bars and two cavities are shown, more or fewer spray bars and cavities may be utilized. Further, in some examples, the number of spray bars and cavities may be different, such as two spray bars extending through a single cavity.

Figure 7:
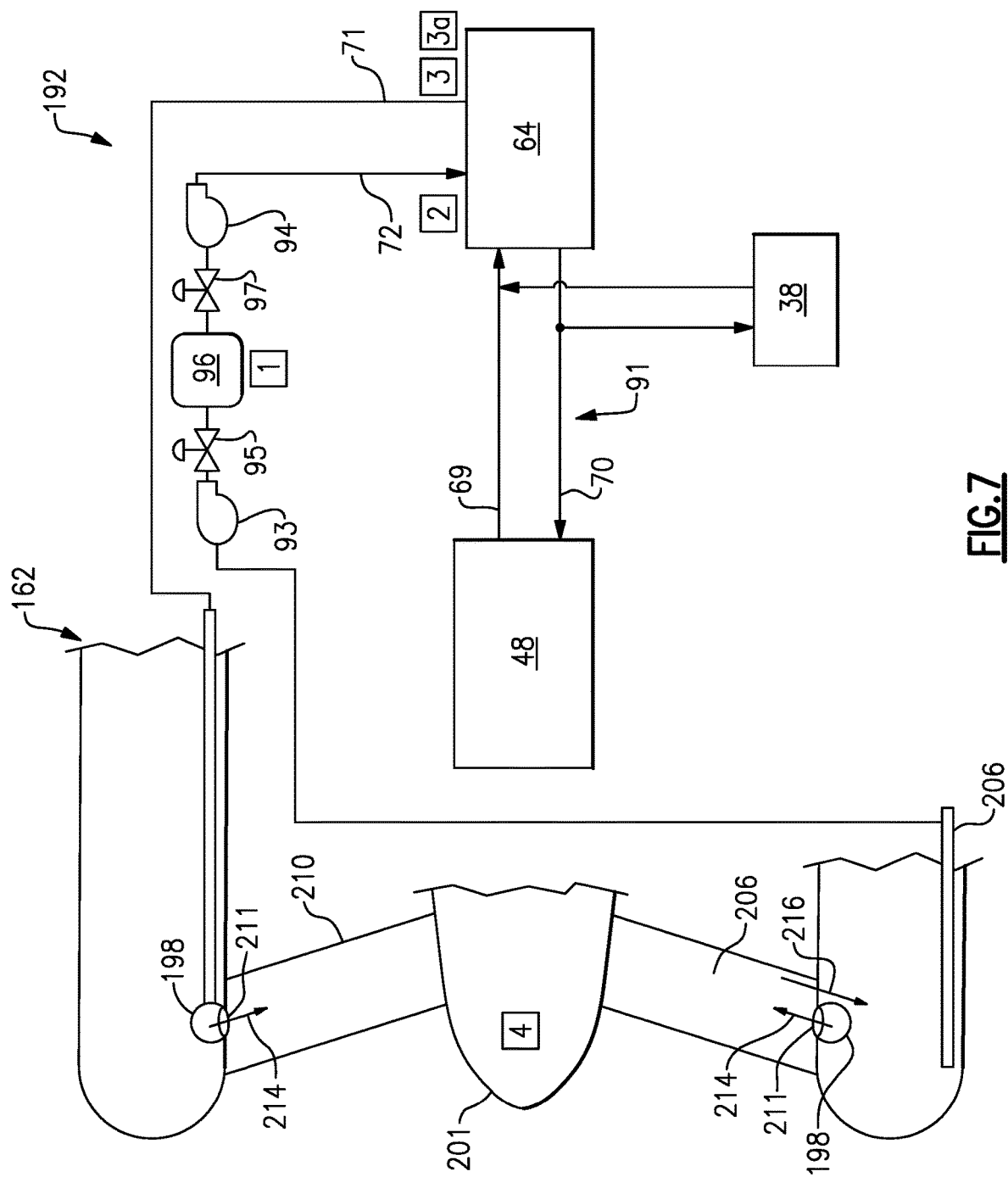
FIG. 7 schematically illustrates another example de-icing system.

FIG. 7 schematically illustrates another example de-icing system. To the extent not otherwise described or shown, the coolant loop 192 in the fan nacelle 162 corresponds to the coolant loop 92 of FIGS. 2-6, with like parts having reference numerals with the addition of one-hundred or multiples thereof to designate modified elements that are understood to incorporate the same features and benefits of the corresponding original elements. In this example, the vaporized coolant 214 enters the fan inlet guide vane 210 via a hole 211 in the manifold 198. The coolant 114 flows radially inward towards the nose cone 201, de-icing the vane 210 and the nose cone 201. The condensed liquid coolant 216 then flows to the return manifold 206 and back to the reservoir 96. This example may provide a simpler arrangement by removing a spray bar within the vane 210.

Figure 8:
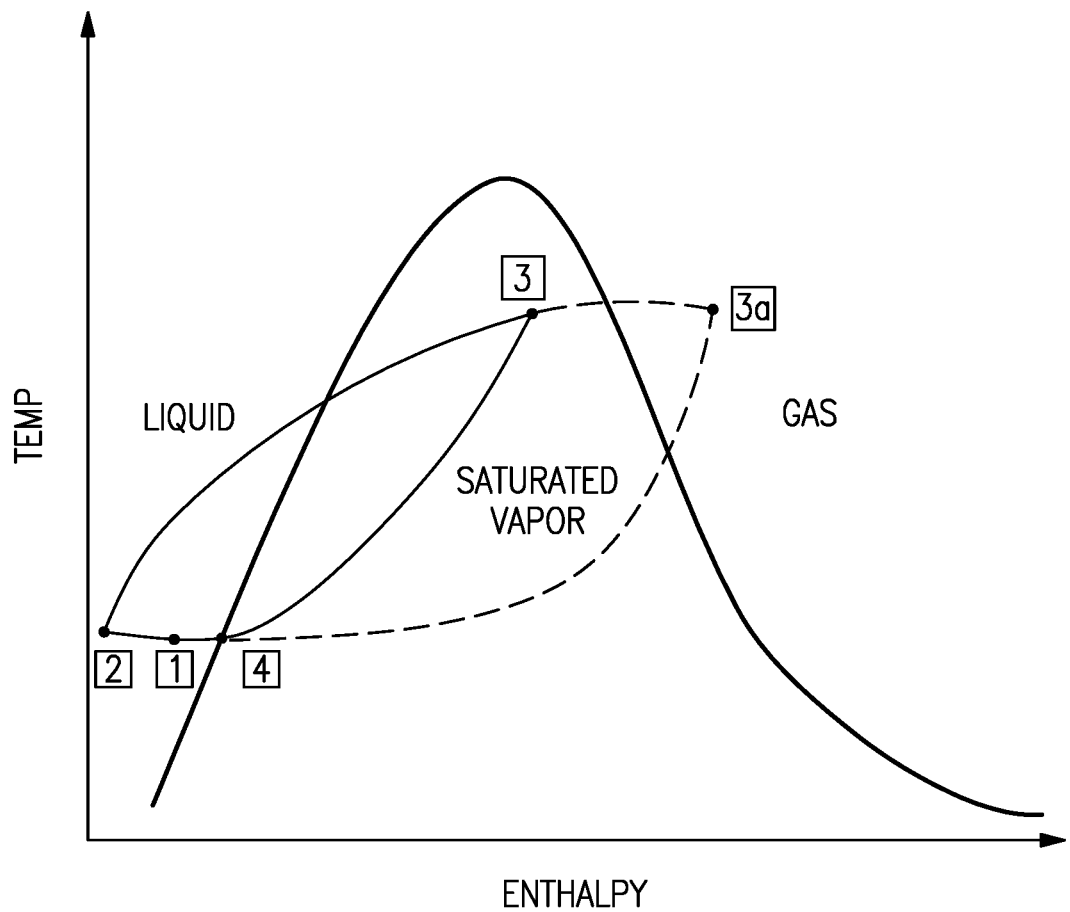
FIG. 8 is a phase change diagram of the coolant used in the de-icing system.

Referring to FIGS. 3, 7, and 8, the coolant at location 1 is a liquid. The liquid coolant is pumped from the reservoir 96 with second pump 94 to the heat exchanger 64 to location 2 where heat is transferred from the engine oil to the coolant. The enthalpy of the liquid coolant is increased by the engine oil and circulated to the annular manifold 98 and spray bars 99. The hot gaseous coolant is sprayed through holes 124 in the spray bars 99 as a saturated vapor 3 or a gas 3a onto an inner surface of the vanes 110. Ice on an exterior surface of the vanes 110 is melted as heat is transferred from the hot gaseous coolant or saturated vapor to the ice, which reduces the temperature of the gaseous coolant and condenses the coolant to a liquid at location 4.

The condensed liquid coolant flows from the return manifold 106 back to the reservoir 96. A level sensor 108 (shown in FIG. 2) communicates with the controller 82, which operates the first pump 93, which is used to maintain a desired condensate level within the reservoir 96. The first and second valves 95, 97, which are in communication with the controller 82, are operated to provide desired flow rates and volumes at various locations throughout the coolant loop 92.

Some known anti-ice systems utilize electrical heating elements or heated propulsive engine air. The use of propulsive engine air may be less efficient, as air is directed away from propulsive function. The use of electrically heated inlets may require large amounts of power, and are thus a load on the engine. In one example, the disclosed anti-ice system utilizes heat generated by gearbox lubrication oil to heat the fan inlet guide vanes. In other examples, the anti-ice system utilizes any heat rejection load for de-icing the nacelle, nose cone, and fan inlet guide vanes. This arrangement may improve cycle efficiency by eliminating the use of propulsive engine air for de-icing the fan inlet guide vanes. The disclosed system may be continuously on, which may prevent ice accretion through the entire flight envelope, as the heat source is not limited by the engine power settings. This arrangement may also simplify fabrication of the fan inlet guide vanes.

It should also be understood that although a particular component arrangement is disclosed in the illustrated embodiment, other arrangements will benefit herefrom. For example, other gas turbine engine inlet structures may incorporate the disclosed de-icing arrangement. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine de-icing system comprising:
   a heat exchanger;
   a coolant loop in fluid communication with the heat exchanger and configured to circulate a heat transfer fluid;
   an engine oil loop in fluid communication with the heat exchanger and configured to transfer heat to the heat transfer fluid; and
   a gas turbine engine inlet structure having at least one fan inlet guide vane arranged axially forward of a fan, a spray bar disposed at least partially in the at least one fan inlet guide vane, the spray bar is in fluid communication with the coolant loop, the spray bar configured to spray the heat transfer fluid onto an inner surface of the at least one fan inlet guide vane to de-ice the fan inlet guide vane.

2. The gas turbine engine de-icing system according to claim 1, wherein the heat exchanger is arranged in a passageway configured to be exposed to an airflow.

3. The gas turbine engine de-icing system according to claim 2, comprising a fan nacelle and a core nacelle that provide a bypass flow path, the passageway in fluid communication with the bypass flow path.

4. The gas turbine engine de-icing system according to claim 1, wherein an annular manifold is arranged in the gas turbine engine inlet structure, the annular manifold in fluid communication with the spray bar.

5. The gas turbine engine de-icing system according to claim 4, wherein the coolant loop includes a reservoir and a pump configured to circulate the heat transfer fluid, the reservoir arranged downstream from the manifold and configured to collect the heat transfer fluid.

6. The gas turbine engine de-icing system according to claim 1, wherein the engine inlet structure is a fan nacelle and the heat transfer fluid travels radially inward through the spray bar from the fan nacelle toward a nose cone.

7. The gas turbine engine de-icing system according to claim 6, wherein the heat transfer fluid collects in the nose cone and runs towards a bottom of the fan nacelle, where the heat transfer fluid is collected and returned to the coolant loop.

8. The gas turbine engine of claim 7, wherein the heat transfer fluid runs from the nose cone through a fan inlet guide vane in a lower half of the fan nacelle to a return manifold.

9. The gas turbine engine de-icing system according to claim 6, wherein the spray bar is one of a plurality of spray bars and the at least one fan inlet guide vane is at least one of a plurality of fan inlet guide vanes arranged circumferentially about the nose cone, one of the plurality of spray bars extending into each of the plurality of fan inlet guide vanes.

10. The system according to claim 1, wherein the spray bar is configured to spray the heat transfer fluid towards a leading edge of the fan inlet guide vane and a second spray bar is arranged in the fan inlet guide vane, the second spray bar is configured to spray the heat transfer fluid towards a trailing edge of the fan inlet guide vane.

11. The gas turbine engine de-icing system according to claim 1, comprising at least one of a gearbox configured to operatively connect a turbine section and a fan section and a bearing system in fluid communication with the engine oil loop.

12. The gas turbine engine de-icing system according to claim 1, wherein the heat transfer fluid is a phase change fluid that changes phase from a liquid to a gas or saturated vapor in a range of 200° F.-500° F. (93° C.-260° C.).

13. A method of de-icing a gas turbine engine component comprising the steps of:
   circulating an engine fluid to a heat exchanger;
   rejecting heat from the engine fluid to a heat transfer fluid;
   circulating the heat transfer fluid to a first fan inlet guide vane arranged axially forward of a fan;
   de-icing the first fan inlet guide vane with the heat transfer fluid;
   circulating the heat transfer fluid from the first fan inlet guide vane to a nose cone; and
   circulating the heat transfer fluid from the nose cone through a second fan inlet guide vane in a lower half of a fan nacelle to a return manifold.

14. The method according to claim 13, wherein the engine fluid is engine oil, and the circulating the engine fluid step includes pumping the engine oil from at least one of a gearbox and bearing system.

15. The method according to claim 13, wherein the circulating the heat transfer fluid to the first fan inlet guide vane step comprises directing the heat transfer fluid onto an inner surface of the fan inlet guide vane.

16. The method according to claim 13, wherein the heat transfer fluid is a phase change fluid, and comprising a step of spraying gaseous or saturated vapor heat transfer fluid onto the fan inlet guide vane to de-ice the fan inlet guide vane, and condensing the gaseous or saturated vapor heat transfer fluid to a liquid heat transfer fluid with the de-iced fan inlet guide vane.

17. The method according to claim 16, comprising a step of collecting the condensed liquid heat transfer fluid in a reservoir.

18. A gas turbine engine, comprising:
- a fan nacelle having at least one fan inlet guide vane arranged axially forward of a fan; and
- means for directing a heat transfer fluid onto an inner surface of the at least one fan inlet guide vane, wherein the heat transfer fluid travels radially inward towards a nose cone and then runs from the nose cone through a fan inlet guide vane in a lower half of the fan nacelle to a return manifold.

19. The gas turbine engine of claim 18, wherein the heat transfer fluid is communicated to the at least one fan inlet guide vane from a coolant loop in fluid communication with a heat exchanger.

\* \* \* \* \*